US012571322B1

(12) United States Patent　　　(10) Patent No.:　US 12,571,322 B1
Mirzamoghadam　　　　　　　　　(45) Date of Patent:　Mar. 10, 2026

(54) FIRST STAGE IMPULSE STEAM TURBINE NOZZLE AXIALLY TANGENTIAL HOLES MATRIX

(71) Applicant: NORTHROP GRUMMAN SYSTEMS CORPORATION, Falls Church, VA (US)

(72) Inventor: Alexander V. Mirzamoghadam, San Jose, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 19/227,873

(22) Filed: Jun. 4, 2025

(51) Int. Cl.
　　*F01D 9/04*　　　(2006.01)
　　*B33Y 10/00*　　　(2015.01)
　　*B33Y 80/00*　　　(2015.01)
　　*F01D 1/02*　　　(2006.01)

(52) U.S. Cl.
　　CPC .............. *F01D 9/04* (2013.01); *F01D 1/026* (2013.01); *B33Y 10/00* (2014.12); *B33Y 80/00* (2014.12); *F05D 2230/31* (2013.01); *F05D 2240/128* (2013.01); *F05D 2240/241* (2013.01); *F05D 2250/141* (2013.01); *F05D 2250/38* (2013.01)

(58) Field of Classification Search
　　CPC ... F01D 1/026; F01D 1/04; F01D 9/02; F01D 9/04; F01D 9/047; F05D 2260/14; F05D 2240/128; F05D 2240/241; F05D 2240/242; F05D 2250/141; F05D 2230/31; F05D 2230/311; F05D 2230/312; F05D 2230/313; F05D 2230/314; B33Y 10/00; B33Y 30/00; B33Y 80/00

USPC ......................................................... 415/202
See application file for complete search history.

(56) References Cited

U.S. PATENT DOCUMENTS

| 553,659 | A | * | 1/1896 | Parsons ................... | F01D 9/047 |
| | | | | | 415/185 |
| 591,822 | A | * | 10/1897 | Curtis ....................... | F03B 1/04 |
| | | | | | 415/199.5 |
| 850,200 | A | * | 4/1907 | Ahlquist ................. | F01D 5/141 |
| | | | | | 415/191 |
| 8,381,533 | B2 | | 2/2013 | Smoke et al. | |

(Continued)

FOREIGN PATENT DOCUMENTS

CN　　　108087123　A　*　5/2018

OTHER PUBLICATIONS

Engliush machine translation of CN-108087123-A, Jul. 20, 2025.*

*Primary Examiner* — Christopher Verdier
(74) *Attorney, Agent, or Firm* — KATTEN MUCHIN ROSENMAN LLP

(57)　　　　　ABSTRACT

The turbine nozzle includes a body having first and second sides defining a thickness between the first and second sides. Nozzle holes are formed through the thickness between the first and second sides. Each nozzle hole has an inlet on the first side of the body to receive fluid and an outlet on the second side of the body to direct the fluid to a turbine rotor. The nozzle holes are arranged in a plurality of circular patterns on the first side about a central axis. An inlet area of each nozzle hole is larger than an outlet area. Inlet areas of the nozzle holes arranged in the same circular pattern are the same, but inlet areas of the nozzle holes arranged in a circular pattern having a larger radius are larger than inlet areas of the nozzle holes arranged in a circular pattern having a smaller radius.

16 Claims, 3 Drawing Sheets

(56)    References Cited

U.S. PATENT DOCUMENTS

| | | | |
|---|---|---|---|
| 9,376,927 | B2 | 6/2016 | Stein et al. |
| 10,156,149 | B2 | 12/2018 | Ristau et al. |
| 10,221,708 | B2 | 3/2019 | Hu |
| 10,591,263 | B2 | 3/2020 | Brown et al. |

\* cited by examiner

FLUID SOURCE

FIRST STAGE IMPULSE STEAM TURBINE NOZZLE AXIALLY TANGENTIAL HOLES MATRIX

BACKGROUND

Turbines are machines that use the high pressure and/or high temperature fluid, such as steam and gas, to provide mechanical motions, by converting the pressure/heat energy of the fluid into mechanical energy. The turbines generally include nozzles and a turbine rotor having blades attached to a shaft. The nozzles convert the high pressure/heat energy of the fluid into kinetic energy, and inject the fluid into the blades of the turbine rotor.

The turbines may be categorized into impulse type turbines and reaction type turbines. The impulse type turbines convert pressure/heat energy into kinetic energy via nozzles and symmetric moving blades. The reaction type turbines convert pressure/heat energy into kinetic energy in both nozzles and profiled moving blades. Turbine systems may be a combination of the impulse type and reaction type turbines, providing both impulse stages and reaction stages. Impulse stages, in which pressure of the fluid is high, are typically used for the initial stages of a turbine, and may be followed by reaction stages. An impulse first stage steam turbine imparts a substantial pressure drop through the nozzle, which is followed by constant pressure across the downstream blades to rotate them. Current state of art is for the flow to pass through a set of nozzles or stationary blades whose flow area is nearly constant in the radial direction.

SUMMARY

The disclosed invention provides a turbine nozzle with unique nozzle patterns that increase overall aerodynamic efficiency in a turbine system. The disclosed invention relates to a turbine nozzle, a turbine system including the turbine nozzle, and a method for manufacturing the turbine nozzle by using additive manufacturing (AM). The turbine nozzle of the disclosed invention increases aerodynamic efficiency in an impulse first stage steam turbine by distributing the incoming nozzle flow through radial and circumferential discreet holes spaced in a mechanically feasible pattern that each turn the flow in a pre-specified angle with respect to the rotor direction of rotation in the axial direction. The aerodynamic efficiency of the stage in terms of efficiency points is expected to increase by at least 1.5% points. The turbine nozzle includes a plurality of nozzle holes or through-holes to distribute the incoming nozzle flow. The diameters of the nozzle holes are constant in the circumferential direction, but decrease in the radial direction according to the pressure profile of the incoming steam or fluid, converting pressure energy of the flow to kinetic energy and rotating the downstream rotor blades.

These advantages and others are achieved, for example, by a turbine nozzle including a body that includes a first side and a second side opposing the first side, defining a thickness between the first side and second side, and having a plurality of nozzle holes formed through the thickness between the first side and second side. Each nozzle hole has an inlet on the first side of the body to receive fluid and an outlet on the second side of the body to direct the fluid to a turbine rotor. The nozzle holes are arranged in a plurality of circular patterns on the first side about a central axis. Inlet areas of the nozzle holes arranged in the same circular pattern are the same, and inlet areas of the nozzle holes arranged in a circular pattern having a larger radius are larger than inlet areas of the nozzle holes arranged in a circular pattern having a smaller radius.

The outlet areas of the nozzle holes arranged in the same circular pattern may be the same, and the outlet areas of the nozzle holes arranged in the circular pattern having the larger radius may be larger than outlet areas of the nozzle holes arranged in the circular pattern having the smaller radius. The inlet areas of the nozzle holes may decrease at a rate of 10-40% based on the radii of the circular patterns. The nozzle holes may be configured to convert pressure energy of the fluid into kinetic energy of the fluid to rotate rotor blades of the turbine rotor. In each nozzle hole, the outlet area may be in a range of 80-100% of the inlet area. The inlets of the nozzle holes on the first side may have circular shapes, and outlets of the nozzle holes on the second side may have circular shapes. Each nozzle hole may be angled or curved, while proceeding along the thickness, to direct a nozzle outlet flow toward a tangential direction of a rotation of the turbine rotor. The outlet of each nozzle hole may be configured to direct the nozzle outlet flow at an angle in a range of 0-75 degrees with respect to an axial direction of a shaft of the turbine rotor.

These advantages and others are further achieved, for example, by a turbine system including gas turbines. The turbine system includes a turbine rotor and a turbine nozzle placed in front of the turbine rotor. The turbine rotor includes a plurality of blades attached to a rotatable shaft. The turbine nozzle includes a body that includes a first side and a second side opposing the first side, defining a thickness between the first side and second side, and having a plurality of nozzle holes formed through the thickness between the first side and second side. Each nozzle hole has an inlet on the first side of the body to receive fluid and an outlet on the second side of the body to direct the fluid to the downstream turbine rotating blade. The nozzle holes are arranged in a plurality of circular patterns on the first side about a central axis. Inlet areas of the nozzle holes arranged in the same circular pattern are the same, and inlet areas of the nozzle holes arranged in a circular pattern having a larger radius are larger than inlet areas of the nozzle holes arranged in a circular pattern having a smaller radius. The turbine rotor may be an impulse turbine rotor in which the blades have curved shapes or bucket shapes to directly receive the fluid from the turbine nozzle. The turbine system may further include a fluid source that generates the fluid and supplies the fluid to the turbine nozzle. The fluid may include steam or gas in high pressure and high temperature.

These advantages and others are further achieved, for example, by a method for manufacturing a turbine nozzle that includes a body having a first side and a second side opposing the first side, defining a thickness between the first side and second side, and having a plurality of nozzle holes formed through the thickness between the first side and second side. The method includes fabricating the body of the turbine nozzle with a material suitable for additive manufacturing by using an additive manufacturing machine. Each nozzle hole has an inlet on the first side of the body to receive fluid and an outlet on the second side of the body to direct the fluid to a turbine rotor. The nozzle holes are arranged in a plurality of circular patterns on the first side about a central axis. The inlet areas of the nozzle holes arranged in the same circular pattern are the same, and inlet areas of the nozzle holes arranged in a circular pattern having a larger radius are larger than inlet areas of the nozzle holes arranged in a circular pattern having a smaller radius.

BRIEF DESCRIPTION OF THE DRAWINGS

The preferred embodiments described herein and illustrated by the drawings hereinafter are included to illustrate and not to limit the invention, where like designations denote like elements.

FIG. 1A is a perspective view from the front side and FIG. 1B is a perspective view from the rear side.

DETAILED DESCRIPTION

Figures 1A, 1B, 2:
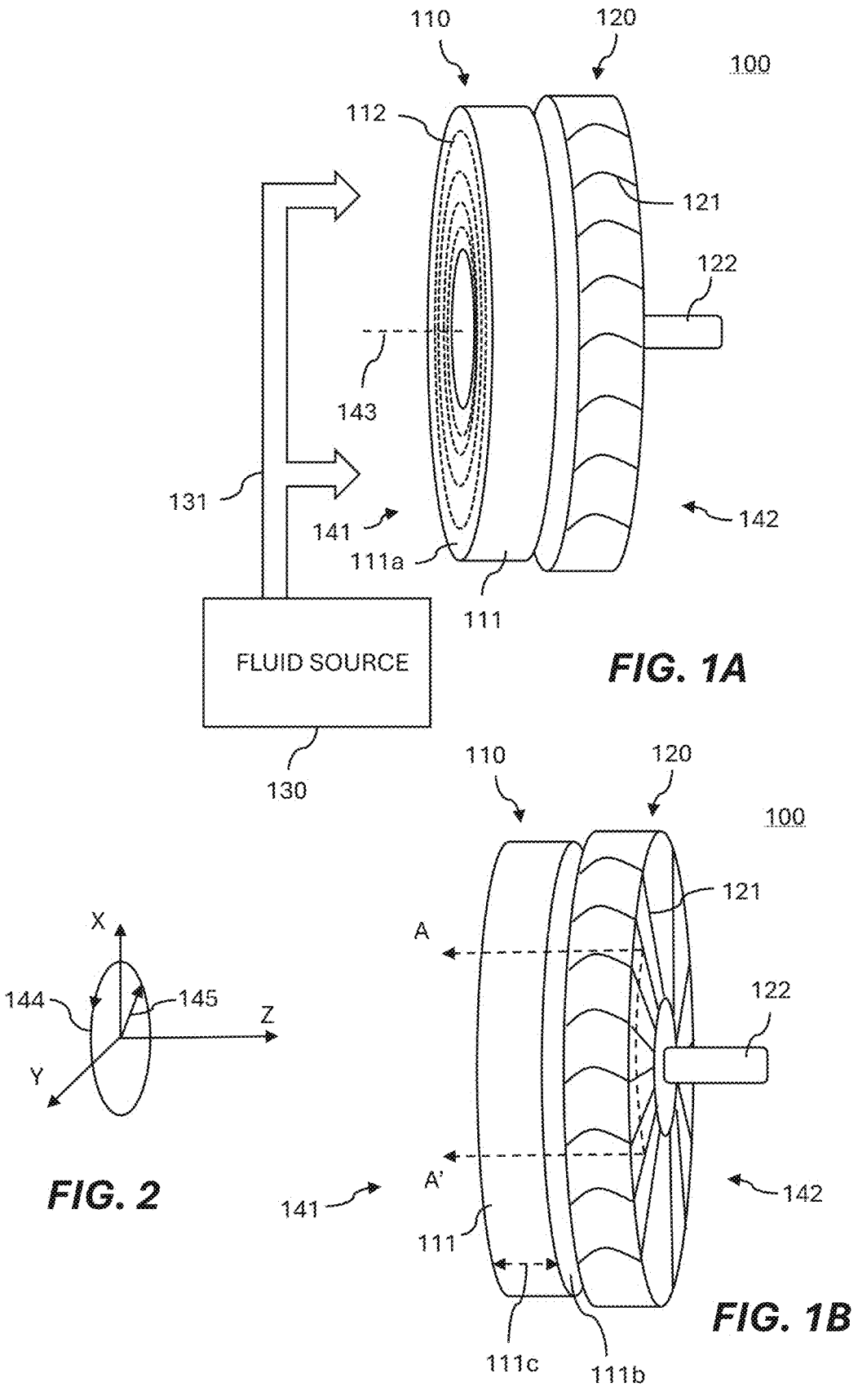
FIGS. 1A-1B illustrate diagrams of a turbine system of the disclosed invention which includes a turbine nozzle and a turbine rotor.
FIG. 2 shows a diagram defining coordinates and directions used in the descriptions.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

Figures 3A, 3B:
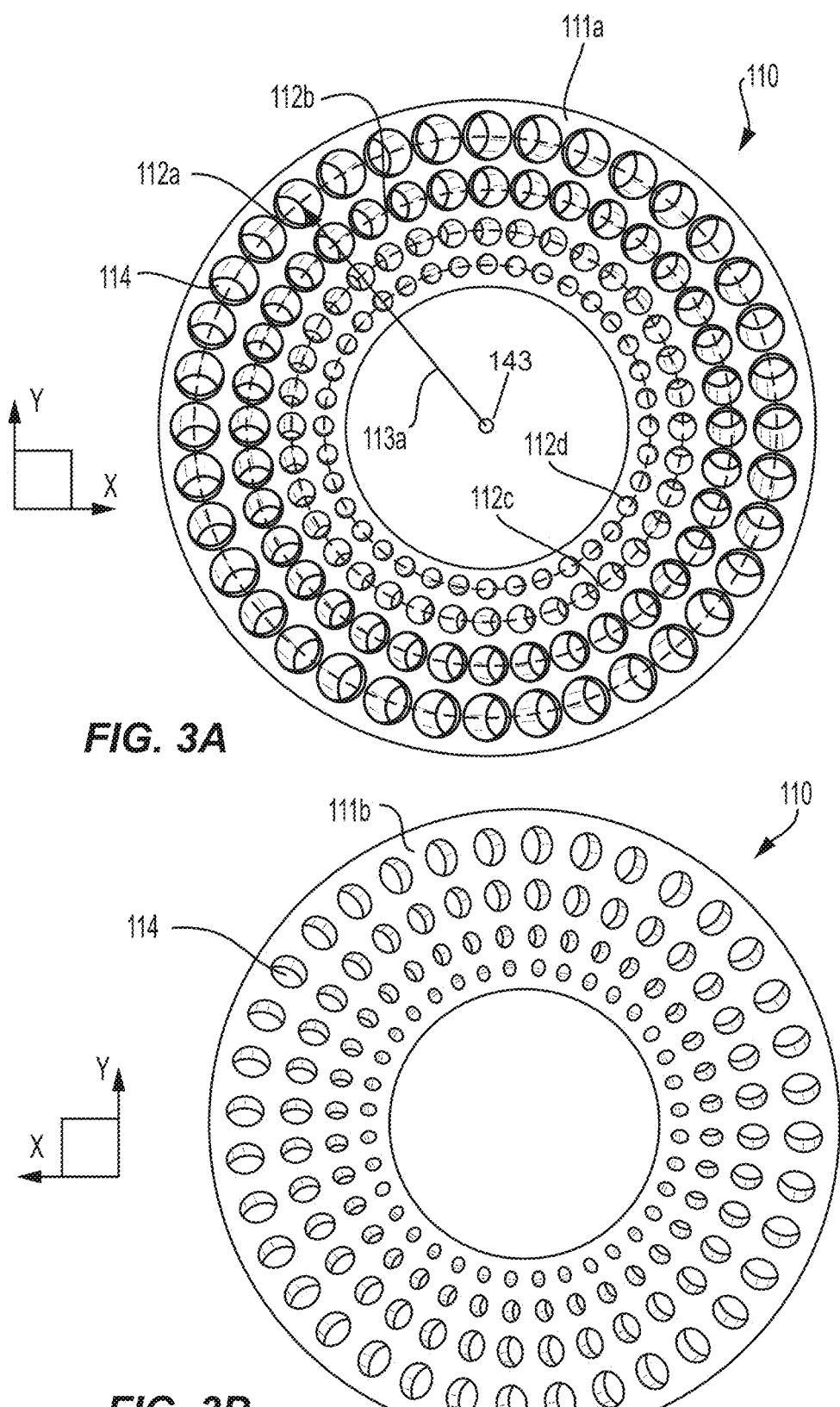
FIGS. 3A-3B show front and rear views of the turbine nozzle of the disclosed invention, respectively.
Figure 4:
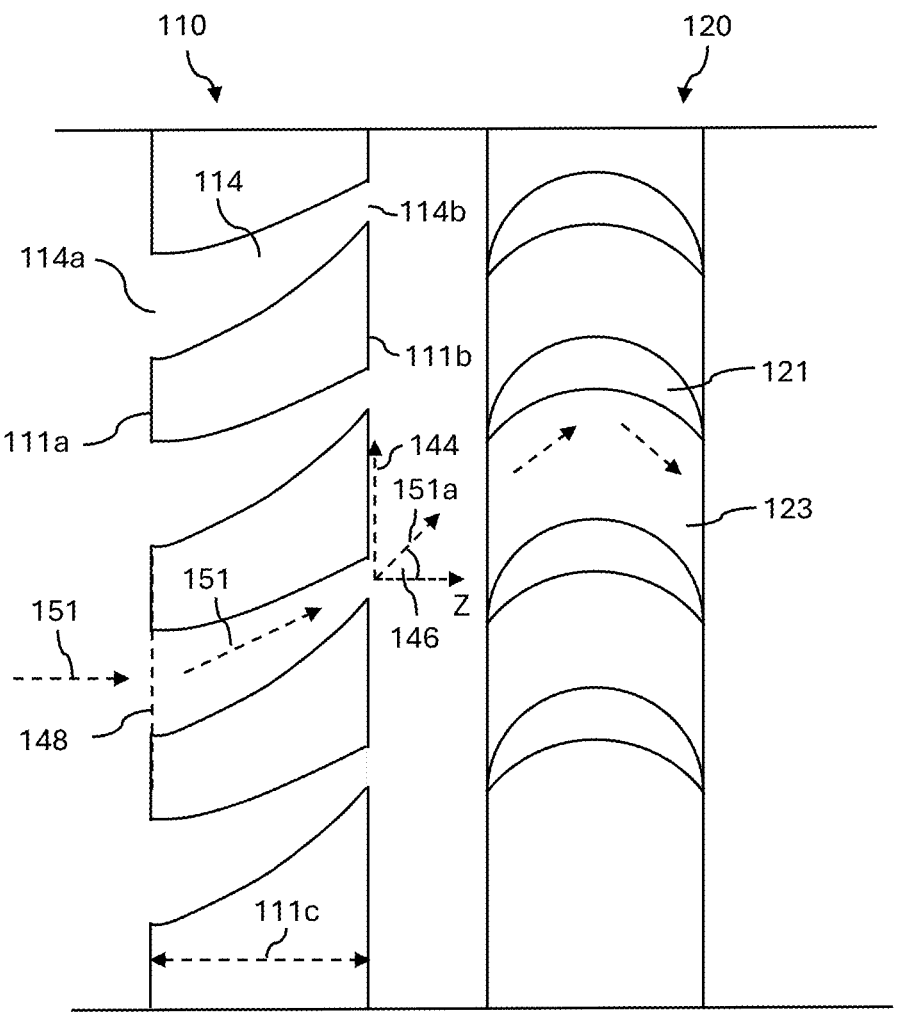
FIG. 4 shows a cross-sectional view cut along the circumferential curve A-A' shown in FIG. 1B.
Figure 5:
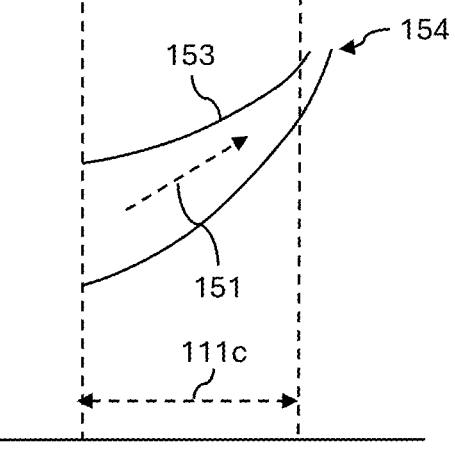
FIG. 5 illustrates a flow profile of fluid passing through the nozzle holes of the turbine nozzle.

With reference to FIGS. 1A-1B, shown are turbine system 100 of the disclosed invention which includes turbine nozzle 110 and turbine rotor 120. FIG. 1A is a perspective view from front side 141 and FIG. 1B is a perspective view from rear side 142. With reference to FIG. 2, shown is a diagram defining coordinates and directions used in the descriptions. With reference to FIGS. 3A-3B, shown are front and rear views of the turbine nozzle 110 of the disclosed invention, respectively. With reference to FIG. 4 shown is a cross-sectional view cut along the circumferential 17 curve A-A' shown in FIG. 1B, along portions of circumferences of the turbine nozzle 110 and turbine rotor 120. With reference to FIG. 5, shown is a flow profile of fluid passing through the nozzle holes 114 of the turbine nozzle 110.

The turbine rotor 120 includes a plurality of blades 121 attached to shaft or axle 122 that is rotatable about an axial axis (Z-axis) of the shaft 122. The turbine rotor 120 rotates by the power of fluid, such as steam and gas, applied to the blades 121. The turbine nozzle 110 is placed adjacent to the turbine rotor 120 and supplies the fluid to the blades 121 to drive the turbine rotor 120. The turbine system 100 may further include fluid source 130 that is configured to generate fluid 131 and supplies the fluid 131 to the turbine nozzle 110. The fluid source 130 may be a boiler or any steam or gas sources. The fluid maybe steam or gas in high pressure (e.g. 1.2 MPa to 22.1 Mpa) and high temperature (e.g. 300 to 600° C.).

The turbine nozzle 110 of the disclosed invention includes body 111 that may have a disc or cylindrical shape with a central axis 143. The body 111 has first side (or inlet side) 111a, second side (or outlet side) 111b opposing the first side 111a, and thickness 111c between the first side 111a and the second side 111b. The first and second sides 111a, 111b of the body 111 are on the X-Y plane, and the thickness 111c is along the Z-axis. The second side 111b faces the turbine rotor 120. The body 111 has a plurality of nozzle holes 114 that are through-holes extending entirely through the thickness 111c, from the first side 111a to the second side 111b. The fluid 131 is supplied to the first side 111a of the body 111, and passes through the nozzle holes 114 to be injected to the blade 121 of the turbine rotor 120. Each nozzle hole 114 has an inlet 114a on the first side 111a of the body 111 to receive the fluid 131 and an outlet 114b on the second side 111b of the body 111 to direct the fluid to the turbine rotor 120. The inlets 114a and outlets 114b of the nozzle holes 114, when viewed from the front side 141 and rear side 142, respectively, may have circular shapes, as shown in FIGS. 3A-3B, defined by diameters. However, the shapes of the inlets 114a and outlets 114b are not limited to the circular shape. The inlets 114a and outlets 114b May have different shapes, such as an oval shape.

The nozzle holes 114 are configured to convert the pressure energy of the incoming fluid in high pressure into kinetic energy (with increased velocity) of the fluid to rotate blades 121 of the turbine rotor 120. The area (or size) of the inlet 114a of the nozzle hole 114 may be larger than the area (or size) of the outlet 114b, or may be the same as the area of the outlet 114b depending on application. In the descriptions, the areas of the inlet 114a and outlets 114b are referred to an inlet area and outlet area, respectively. In each nozzle hole 114, the outlet area May be in a range of 80-100% of the inlet area. The incoming fluid 131 in high pressure experiences pressure drop while the fluid is passing through the nozzle holes 114, and velocity of the fluid increases as the fluid exits the nozzle holes 114. In an impulse first stage turbine, the dropped pressure of the fluid remains constant while the fluid passes through the blades 121 of the turbine rotor 120. The turbine rotor 120 may be an impulse turbine in which the blades 121 have curved shapes or bucket shapes, as shown in FIG. 4, to directly receive the fluid from the turbine nozzle 110.

As shown in FIGS. 3A-3B, the inlets 114a of the nozzle holes 114 are arranged in a pattern 112 that may include a plurality of circular patterns 112a-112d on the first side 111a of the body 111. FIG. 3A exemplarily shows four (4) circular patterns 112a-112d. However, the number of circular patterns is not limited. Each circular pattern may have a circular shape about a central axis 143. The circular patterns 112a-112d are defined by radii from the central axis 143 along the radial direction 145. FIG. 3A exemplarily shows the circular pattern 112a having radius 113a. In the same way, the outlets 114b of the nozzle holes 114 are also arranged in circular patterns on the second side 111b, which correspond to the circular patterns 112a-112d on the first side 111a, as shown in FIG. 3B.

In the disclosed invention, the inlet and outlet areas of the nozzle holes 114 are constant in the circumference direction 144, but change in the radial direction 145 according to the pressure profile, converting pressure energy to kinetic energy and rotating the downstream rotor blades. These changes of the inlet and outlet areas in the radial direction 145 are to improve aerodynamic efficiency. With the turbine nozzle 110 of the disclosed invention, the aerodynamic efficiency of the stage in terms of efficiency points is expected to increase by at least 1.5% points.

As shown in FIG. 3A, the inlet area of the inlet 114a arranged along the same circular pattern are the same. For example, the inlets 114a arranged along the first circular pattern 112a have the same inlet area, the inlets 114a arranged along the second circular pattern 112b have the same inlet area, the inlets 114a arranged along the third circular pattern 112c have the same inlet area, and the inlets 114a arranged along the fourth circular pattern 112d have the same inlet area. However, the inlet areas of the inlet 114a arranged along different circular patterns are not the same. As shown in FIG. 3A, the inlet area of the inlets 114a arranged along the first circular pattern 112a is larger than the inlet area of inlets 114a arranged along the second circular pattern 112b, the inlet area of the inlets 114a arranged along the second circular pattern 112b is larger than the inlet area of inlets 114a arranged along the third circular pattern 112c, and the inlet area of the inlets 114a arranged along the third circular pattern 112c is larger than the inlet area of inlets 114a arranged along the fourth circular pattern 112d. In the disclosed invention, the inlet area of the nozzle holes arranged in a circular pattern having a larger radius are larger than inlet areas of the nozzle holes arranged in a circular pattern having a smaller radius. In the disclosed invention, the inlet areas of the nozzle holes 114 may decrease at a rate of 10-40% based on inlet radial span and pressure profile. For example, the inlet area 114a arranged along the second circular pattern 112b may be 10-40% smaller than the inlet area of inlets 114a arranged along the first circular pattern 112a, the inlet area 114a arranged along the third circular pattern 112c may be 10-40% smaller than the inlet area of inlets 114a arranged along the second circular pattern 112b, and so on.

The outlets 114b of the nozzle holes 114 on the second side 111b also have the same area configuration as described for the inlets 114a. As shown in FIG. 3B, outlet areas of the outlets 114b of the nozzle holes 114 arranged along the same circular pattern are the same. However, the outlet areas of the outlet 114b arranged along different circular patterns are not the same. Outlet areas of the nozzle holes 114 arranged in the circular pattern having a larger radius are larger than outlet areas of the nozzle holes 114 arranged in the circular pattern having a smaller radius.

As shown in FIGS. 3A-3B and 4, each nozzle hole 114 may be angled or curved, while proceeding along the thickness 111c, toward a tangential direction 144 of a rotation of the turbine rotor 120. The tangential direction 144 may be referred to as a circumferential direction of the disc shape turbine nozzle 110 or a direction of rotation of the turbine rotor 120. The angled or curved nozzle hole 114 provides pre-swirling of the flow of the fluid in the direction of the rotation of the turbine rotor 120. Alternatively, the nozzle hole 114 may not be curved but may be aligned along the axial direction of the shaft 122 (along Z-axis).

The nozzle inlet flow 151 (across the surface 148 of the first side 111a) enters axially with respect to the centerline of the shaft 122 of the turbine rotor 120 (along Z-axis), and flows through the nozzle hole 114, and exits tangentially with respect to the Z-axis at exit angle 146. In other words, the nozzle outlet flow 151a may have a tangential flow component along the tangential direction 144 as well as an axial flow component along the Z-axis. The nozzle outlet flow 151a enters the space 123 between the blades 121 to drive the turbine rotor 120. The outlet 114b of the nozzle hole 114 is configured to direct the nozzle outlet flow 151a at exit angle 146 with respect to the axial direction of the shaft 122 (Z-axis). The exit angle 146 may be in a range of 0-75 degrees. As shown in FIG. 5, by the angled or curved nozzle holes 114, the flow 153 of the fluid passing through the nozzle holes 114 make tangential turns 154 in the direction of rotation 144 at the exit of the outlet 114b of the nozzle hole 114.

The disclosed invention further provides a method for manufacturing a turbine nozzle that comprises a body 111 comprising a first side 111a and a second side 111b opposing the first side 111a, defining thickness 111c between the first side 111a and second side 111b, and having a plurality of nozzle holes 114 formed through the thickness 111c between the first and second sides 111a, 111b. The method includes fabricating the body 111 of the turbine nozzle 110 with a material suitable for additive manufacturing by using an additive manufacturing machine such as 3D printers. The material suitable for additive manufacturing may include any plastic materials, thermoplastics, and ceramics that are durable in high pressure and temperature. The material suitable for additive manufacturing may also include materials relevant to turbine systems, which include Nickel, Steel, Aluminum and Titanium alloys. Each nozzle hole 114 has inlet 114a on the first side 111a of the body 111 to receive fluid and outlet 114b on the second side 111b of the body 111 to direct the fluid to the turbine rotor 120. An inlet area of each nozzle hole 114 is larger than an outlet area. The nozzle holes 114 are arranged in a plurality of circular patterns 120a-120d on the first side 111a about a central axis 143. The inlet areas of the nozzle holes 114 arranged in the same circular pattern are the same. The inlet areas of the nozzle holes 114 arranged in a circular pattern having a larger radius are larger than the inlet areas of the nozzle holes 114 arranged in a circular pattern having a smaller radius.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A turbine nozzle, comprising:
   a body comprising a first side and a second side opposing the first side, defining a thickness between the first side and second side, and having a plurality of nozzle holes formed through the thickness between the first side and second side, wherein:
   each nozzle hole has an inlet on the first side of the body to receive fluid and an outlet on the second side of the body to direct the fluid to a turbine rotor;
   the nozzle holes are arranged in a plurality of circular patterns on the first side about a central axis;
   inlet areas of the nozzle holes arranged in the same circular pattern are the same; and
   inlet areas of the nozzle holes arranged in a circular pattern having a larger radius are larger than inlet areas of the nozzle holes arranged in a circular pattern having a smaller radius.

2. The turbine nozzle of claim 1 wherein outlet areas of the nozzle holes arranged in the same circular pattern are the same.

3. The turbine nozzle of claim 1 wherein outlet areas of the nozzle holes arranged in the circular pattern having the larger radius are larger than outlet areas of the nozzle holes arranged in the circular pattern having the smaller radius.

4. The turbine nozzle of claim 1 wherein the inlet areas of the nozzle holes decrease at a rate of 10-40% based on the radii of the circular patterns.

5. The turbine nozzle of claim 1 wherein the nozzle holes are configured to convert pressure energy of the fluid into kinetic energy of the fluid to rotate rotor blades of the turbine rotor.

6. The turbine nozzle of claim 1 wherein in each nozzle hole, the outlet area is in a range of 80-100% of the inlet area.

7. The turbine nozzle of claim 1 wherein inlets of the nozzle holes on the first side have circular shapes, and outlets of the nozzle holes on the second side have circular shapes.

8. The turbine nozzle of claim 1 wherein each nozzle hole is angled or curved, while proceeding along the thickness, to direct a nozzle outlet flow toward a tangential direction of a rotation of the turbine rotor.

9. The turbine nozzle of claim 8 wherein the outlet of each nozzle hole is configured to direct the nozzle outlet flow at an angle in a range of 0-75 degrees with respect to an axial direction of a shaft of the turbine rotor.

10. A turbine system including gas turbines, comprising:
    a turbine rotor comprising a plurality of blades attached to a rotatable shaft; and
    a turbine nozzle placed in front of the turbine rotor, wherein the turbine nozzle comprises:
        a body comprising a first side and a second side opposing the first side, defining a thickness between the first side and second side, and having a plurality of nozzle holes formed through the thickness between the first side and second side, wherein:
        the second side of the body faces the turbine rotor;
        each nozzle hole has an inlet on the first side of the body to receive fluid and an outlet on the second side of the body to direct the fluid to the blades of the turbine rotor;
        the nozzle holes are arranged in a plurality of circular patterns on the first side about a central axis;

inlet areas of the nozzle holes arranged in the same circular pattern are the same; and
        inlet areas of the nozzle holes arranged in a circular pattern having a larger radius are larger than inlet areas of the nozzle holes arranged in a circular pattern having a smaller radius.

11. The turbine system of claim 10 wherein the turbine rotor is an impulse turbine rotor in which the blades have curved shapes or bucket shapes to directly receive the fluid from the turbine nozzle.

12. The turbine system of claim 10 further comprising a fluid source that generates the fluid and supplies the fluid to the turbine nozzle.

13. The turbine system of claim 10 wherein the fluid comprises steam or gas in high pressure and high temperature.

14. The turbine system of claim 10 wherein outlet areas of the nozzle holes arranged in the same circular pattern are the same, and outlet areas of the nozzle holes arranged in the circular pattern having the larger radius are larger than outlet areas of the nozzle holes arranged in the circular pattern having the smaller radius.

15. The turbine system of claim 10 wherein the nozzle holes are configured to convert pressure energy of the fluid into kinetic energy of the fluid to rotate the blades of the turbine rotor.

16. The turbine system of claim 10 wherein each nozzle hole is angled or curved, while proceeding along the thickness, to direct a nozzle outlet flow toward a tangential direction of a rotation of the turbine rotor.

* * * * *